Sept. 3, 1946.   H. C. EDWARDS   2,407,144
RESILIENT DRIVE GEARING
Filed Oct. 7, 1942    2 Sheets-Sheet 2
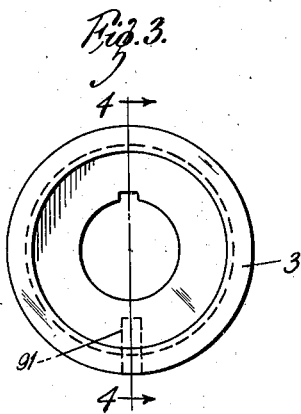
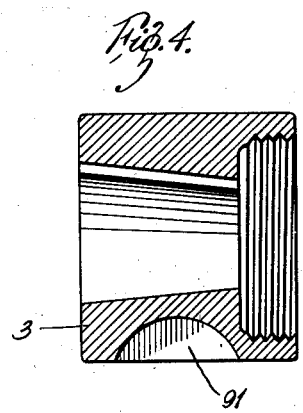
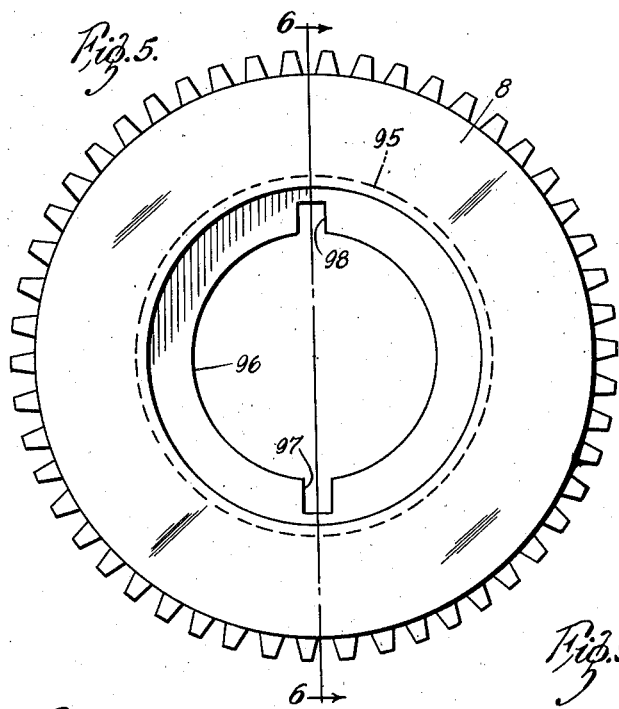
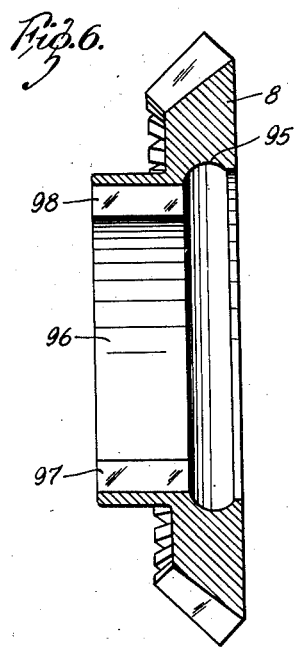
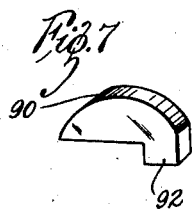
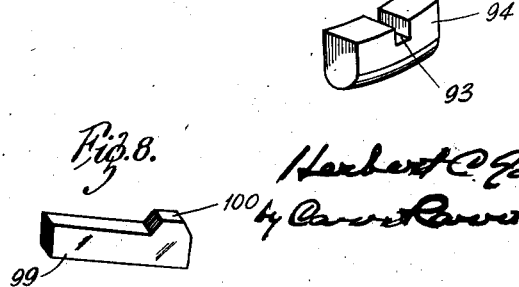
INVENTOR:
Herbert C. Edwards
by [signature]
HIS ATTORNEYS.

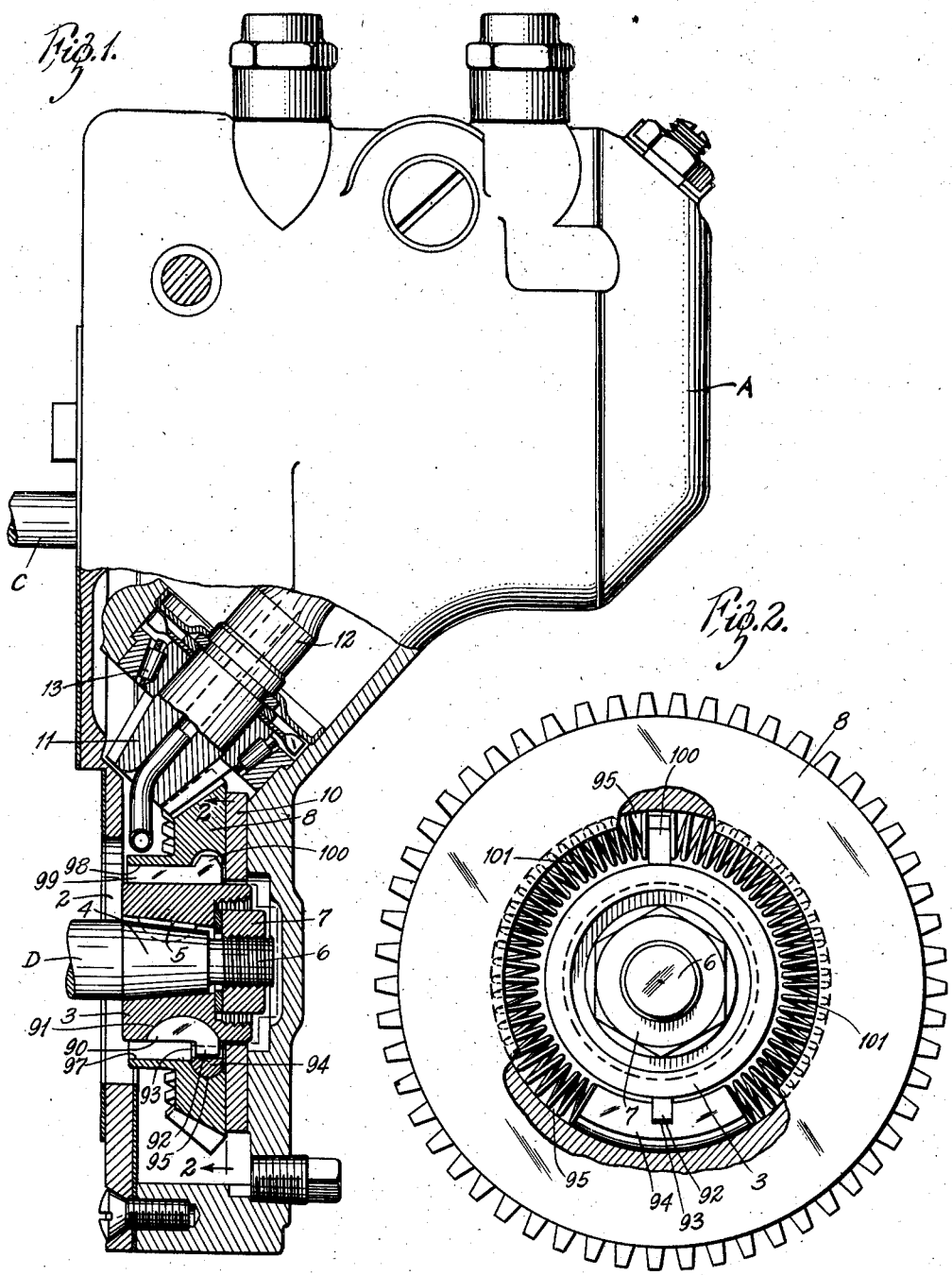

Patented Sept. 3, 1946

2,407,144

UNITED STATES PATENT OFFICE 2,407,144

RESILIENT DRIVE GEARING

Herbert C. Edwards, Massillon, Ohio, assignor to The Timken Roller Bearing Company, Canton, Ohio, a corporation of Ohio Application October 7, 1942, Serial No. 461,183

5 Claims. (Cl. 64—27)

This invention relates to resilient driving connections between a driving shaft and a gear thereon. The principal object of the present invention is to provide a resilient drive gearing that will prevent torsional shock or impulses from being transferred from the driving shaft to the gear thereon and thus interfering with the steady or smooth operation of the latter. Other objects are to provide for simplicity and cheapness of construction and easy assembly and disassembly of the resilient drive gearing connection. The invention consists in the resilient drive gearing and in the construction, combinations and arrangements of parts hereinafter described and claimed.

In the accompanying drawings which form part of this specification and wherein like symbols refer to like parts wherever they occur, Fig. 1 is a vertical section through the drive receiving portion of a speed governor provided with a resilient drive gearing embodying my invention, Fig. 2 is an enlarged vertical cross-section on the line 2—2 in Fig. 1, Fig. 3 is an end view of the driving gear sleeve, Fig. 4 is a central longitudinal section through said sleeve on the line 4—4 in Fig. 3, Fig. 5 is an end view of a driving gear, Fig. 6 is a central longitudinal section through said driving gear on the line 6—6 in Fig. 5, Fig. 7 is a perspective view of the key for the driving gear sleeve, Fig. 8 is a perspective view of the key for the driving gear; and Fig. 9 is a perspective view of the arcuate driving or slide plate for the driving gear.

In the accompanying drawings my invention is shown embodied in an engine governor of the kind shown in my copending application Serial No. 349 034 filed August 1, 1940, now Patent No. 2,302,906. Said governor comprises a housing A having a horizontal opening 2 through one side thereof adapted to receive one end of an engine driven fuel injection pump shaft D, which serves as the driving shaft for the governor.

Mounted on the portion of the cam or pump shaft D located within the lower portion of the governor housing A is a driving sleeve 3 having a tapered bore adapted to fit a tapered seat 4 provided therefor on said shaft adjacent to the end thereof. The driving sleeve 3 is non-rotatably secured to the tapered portion 4 of the cam shaft D preferably by means of a key 5. The cam shaft D terminates in a threaded end portion 6 having a nut 7 threaded thereon; and this nut serves to clamp the driving sleeve 3 on the tapered portion 4 of said shaft, thereby preventing relative endwise movement of said shaft and sleeve.

Mounted on and driven by the driving sleeve 3 is a bevel driving gear or pinion 8. Surrounding the driving sleeve, between the front end wall of the governor housing A and the adjacent end face of the driving gear 8 is a washer 10 adapted to receive the end thrust of said gear. Intermeshing with and driven by the bevel driving gear 8 is a bevel gear 11 formed on or secured to the lower end of a governor shaft 12 which is located in the governor housing A above at an oblique angle to said driving gear and is journaled near its lower end in a suitable tapered roller bearing 13 located in said housing.

According to the present invention the driving connection between the driving gear 8 and the driving sleeve 3 therefor comprises a key 90 having a snug fit in an exterior longitudinal groove or keyway 91 provided therefor in said sleeve. The bottom surfaces of the key 90 and keyway 91 are curved to prevent movement of said key lengthwise of said sleeve. This Woodruff type key 90 has an outstanding driving lug or projection 92 at one end thereof that fits in a cross groove or notch 93 provided therefor in the inner peripheral edge of an arcuate driving plate 94, whose outer peripheral portion is supported in an annular groove 95 provided therefor in the axial sleeve receiving bore 96 of the driving gear 8 for circumferential sliding movement relative to said gear. The axial bore 96 of the driving gear 8 has a longitudinal groove 97 formed therein adapted to register with the driving lug 92 of the key 90 to permit axial assembly and disassembly of said gear and the supporting and driving sleeve 3 therefor. The axial driving sleeve receiving bore 96 of the driving gear 8 has a longitudinal groove or keyway 98 therein diametrically opposite the longitudinal groove 97. Seated in the longitudinal groove 98 in the axial bore 96 of the driving gear 8 substantially flush with the surface of said bore is a key or driving member 99 having a headed end portion 100 disposed in the annular groove 95 formed in said bore for supporting the arcuate driving plate 94. Mounted in the annular groove 95 in the axial bore 96 of the driving gear 8 between each end of the arcuate drive plate 94 and the corresponding face of the head portion 100 of the driving key or lug 99 seated in said bore is a coil compression spring 101. By this arrangement, the drive is transmitted from the drive sleeve 3 fixed to the pump or drive shaft D to the driving gear 8 through the key 90 to the arcuate driving plate 94, thence through one of the coil springs 101 depending on the direction of rotation of said shaft, to the driving gear key 99 and thence to said driving gear. This arrangement forms a resilient drive gear connection between the pump shaft D and the driving gear 8 for the governor, which connection prevents torsional shocks generated in the injection pump due to the separate fuel injections or to the combustion characteristics of the engine, from being transmitted to the governor shaft 12 and thus interfering with the smoothness of action of the governor in controlling the supply of fuel to the engine. The parts forming the flexible drive gearing are simple and inexpensive and permit ready assembly and disassembly of the driving gear and sleeve. The entire driving gear assemably is retained between the washer 10 and the adjacent end of the injection pump; and the sliding connection between the key 90 and the arcuate plate 94 permits relative axial sliding movement of the pump shaft D and the driving gear 8, this endwise floating movement of the driving gear being limited in one direction by the gear 11 on the driven shaft 12 of the governor and in the other direction by the thrust washer 10 back of the driving gear. This floating gear arrangement provides proper meshing of the gears 8 and 11; and also cooperates with the resilient driving connection to cushion or iron out the pump impulses and thus improve the governor action on the engine. The action of the shoe 94 and outer part of springs 101, during torsional oscillation of gear 8, in rubbing over groove 95 furnishes a very effective dampening on any natural tendency of the springs 101 to build up amplitude torsionally.

Obviously, the hereinbefore described resilient drive gearing admits of considerable modification without departing from the invention. Therefore, I do not wish to be limited to the precise details shown and described.

What I claim is:

1. A resilient drive gearing comprising a shaft, a gear on said shaft, and a resilient driving connection between said shaft and gear, said driving connection comprising a driving member rotatable with said shaft and supporting said gear, a member mounted in said gear for rotary movement relative thereto, an abutment member rigid with said gear, a spring interposed between said abutment member and the member that is mounted in said gear for rotation relative thereto, and an axially slidable driving connection between said driving member and the member that is mounted in said gear for rotation relative thereto.

2. A resilient driving connection comprising a driving shaft, a gear on said driving shaft, and a resilient driving connection between said driving shaft and driving shaft gear, said driving connection comprising a key rotatable with said driving shaft and having an outstanding driving lug, a plate member mounted in said driving shaft gear for rotary movement relative thereto and having a notch therein adapted to receive said driving lug, an abutment rigid with said driving shaft gear substantially diametrically opposite said plate member, and a coil compression spring mounted in said driving shaft gear between said plate member and said abutment for transmitting from said plate member to said abutment the rotary driving force transmitted to said plate member by said key.

3. A resilient driving connection comprising a driving shaft, a gear on said driving shaft, and a resilient driving connection between said driving shaft and driving shaft gear, said driving connection comprising a driving sleeve fixed to said driving shaft and supporting said driving shaft gear, a key fixed to said sleeve and having a driving lug projecting radially therefrom, said driving shaft gear having an internal annular groove therein, an arcuate plate member mounted in said groove for circumferential sliding movement therein and having a notch therein adapted to receive said driving lug, an abutment in said groove substantially diametrically opposite said plate member, and coil springs mounted in said annular groove between said plate member and said abutment for transmitting from said plate member to said abutment the driving force transmitted to said plate member by said key.

4. A resilient driving connection comprising a driving shaft, a driving sleeve fixed to said driving shaft, a driving gear journaled on said driving sleeve, said driving gear having an annular groove in the driving sleeve receiving bore thereof, an arcuate plate mounted in said annular groove for circumferential sliding movement therein, said plate having a notch therein extending from side to side thereof lengthwise of said bore of said driving gear, a key seated in said driving sleeve and having a driving lug fitting into said notch, an abutment plate mounted in said bore of said driving gear and having a portion disposed in said annular groove substantially diametrically opposite the arcuate plate therein, and coil compression springs mounted in said annular groove between said arcuate plate and said abutment plate for transmitting the rotary movement of said driving sleeve to said driving gear.

5. A resilient drive gearing comprising a shaft, a driving sleeve fixed to said shaft, a gear mounted on said driving sleeve for axially sliding and rotary movement relative thereto, said gear having an annular groove in the driving sleeve receiving bore thereof, an arcuate plate mounted in said annular groove for circumferential sliding movement therein, said plate having a notch in the inner peripheral edge thereof disposed lengthwise of said bore of said gear, a key fixed to said driving sleeve and having an outstanding driving lug fitting into said notch and engageable therewith and disengageable therefrom by relative axial movement of said driving sleeve and gear, an abutment plate mounted in said bore of said gear and having a portion extending into said annular groove at a point spaced circumferentially from the arcuate plate therein, and coil compression springs seated in said annular groove between said arcuate plate and said abutment plate for transmitting the rotary movement of said driving sleeve to said gear, said gear having a longitudinal groove in the bore thereof that opens into said annular groove adjacent to the driving lug of said key and is adapted to accommodate said driving lug during the axial assembly and disassembly of said gear and driving sleeve.

HERBERT C. EDWARDS.